(12) United States Patent
Nohara et al.

(10) Patent No.: US 6,863,849 B2
(45) Date of Patent: Mar. 8, 2005

(54) APPARATUS AND METHOD OF MOLDING COMPOSITE FOAM MOLDING ELEMENT AND COMPOSITE FOAM MOLDING ELEMENT OBTAINED BY THE SAME

(75) Inventors: Iwao Nohara, Nakatugawa (JP); Shigeki Yoshimura, Ena-gun (JP); Kiyotaka Ida, Nakatugawa (JP)

(73) Assignee: Daisen Industry Co., Ltd. (JP)

( * ) Notice: Subject to any disclaimer, the term of this patent is extended or adjusted under 35 U.S.C. 154(b) by 345 days.

(21) Appl. No.: 10/278,983

(22) Filed: Oct. 24, 2002

(65) Prior Publication Data

US 2003/0059596 A1 Mar. 27, 2003

Related U.S. Application Data

(62) Division of application No. 09/761,657, filed on Jan. 18, 2001, now Pat. No. 6,547,547.

(30) Foreign Application Priority Data

| Feb. 1, 2000 | (JP) | ................................... 2000-24123 |
| Jul. 3, 2000 | (JP) | ................................... 2000-200898 |
| Dec. 19, 2000 | (JP) | ................................... 2000-385265 |

(51) Int. Cl.[7] .............................................. B29C 44/06
(52) U.S. Cl. ..................... 264/45.4; 264/46.5; 264/46.6
(58) Field of Search ..................... 264/45.4, 46.5, 264/46.6

(56) References Cited

U.S. PATENT DOCUMENTS

| 3,220,058 A | 11/1965 | Ehrenfreund | ................... 18/30 |
| 3,338,999 A | 8/1967 | Knapp | ................... 264/113 |
| 3,801,244 A | * 4/1974 | Eisenberg | ................... 425/102 |
| 4,627,946 A | 12/1986 | Crabtree | ................... 264/51 |
| 4,798,549 A | 1/1989 | Hirsch | ................... 441/74 |

FOREIGN PATENT DOCUMENTS

| GB | 2 040 788 A | 1/1979 |
| JP | 4-344227 | 5/1991 |
| JP | 4-344227 | 11/1992 |
| JP | 7-32523 | 2/1995 |
| JP | 7-156182 | 6/1995 |
| JP | 07-223234 | 8/1995 |
| JP | 8-238641 | 9/1996 |
| JP | 11-048349 | 2/1999 |
| JP | 11-129274 | 5/1999 |
| JP | 11-309735 | 11/1999 |

* cited by examiner

Primary Examiner—Allan R. Kuhns
(74) Attorney, Agent, or Firm—Parkhurst & Wendel, L.L.P.

(57) ABSTRACT

A method of molding a composite foam molding element comprising attaching a top side member to a first die side of a cavity between a pair of dies and a back side member to a second die side of the cavity; supplying raw material beads made of a foam resin to an intervening charging space; discharging air from a plurality of work piece nozzles located at the side of the die wherein the back side member is located; starting air discharging from a work piece nozzle located at a most distant position from a charger for supplying raw material beads when the raw material beads are supplied; charging raw material beads during the starting air discharging step and sequentially discharging air from work piece nozzles located successively closer to a work piece nozzle located at the most proximal position from the charger as raw material beads are charged; and heating charged raw material beads to cause foaming and fusion to integrate a top side member and a back side member with each other via a foam member.

5 Claims, 8 Drawing Sheets

APPARATUS AND METHOD OF MOLDING COMPOSITE FOAM MOLDING ELEMENT AND COMPOSITE FOAM MOLDING ELEMENT OBTAINED BY THE SAME

This is a divisional of application Ser. No. 09/761,657 filed Jan. 18, 2001 now U.S. Pat. No. 6,547,547.

BACKGROUND OF THE INVENTION

1. Field of the Invention

The present invention relates to an improved apparatus and method of molding a composite foam molding element having a top side member and a back side member integrated with each other via a foam member and a novel composite foam molding element obtained by the same.

2. Description of the Related Art

Conventionally, as a method of manufacturing a composite foam molding element having a top side member and a back side member integrated with each other via a foam member, there is adopted a method described in Japanese Patent Application Laid-open Nos. 4-344227 and 6-210753.

Figure 8:
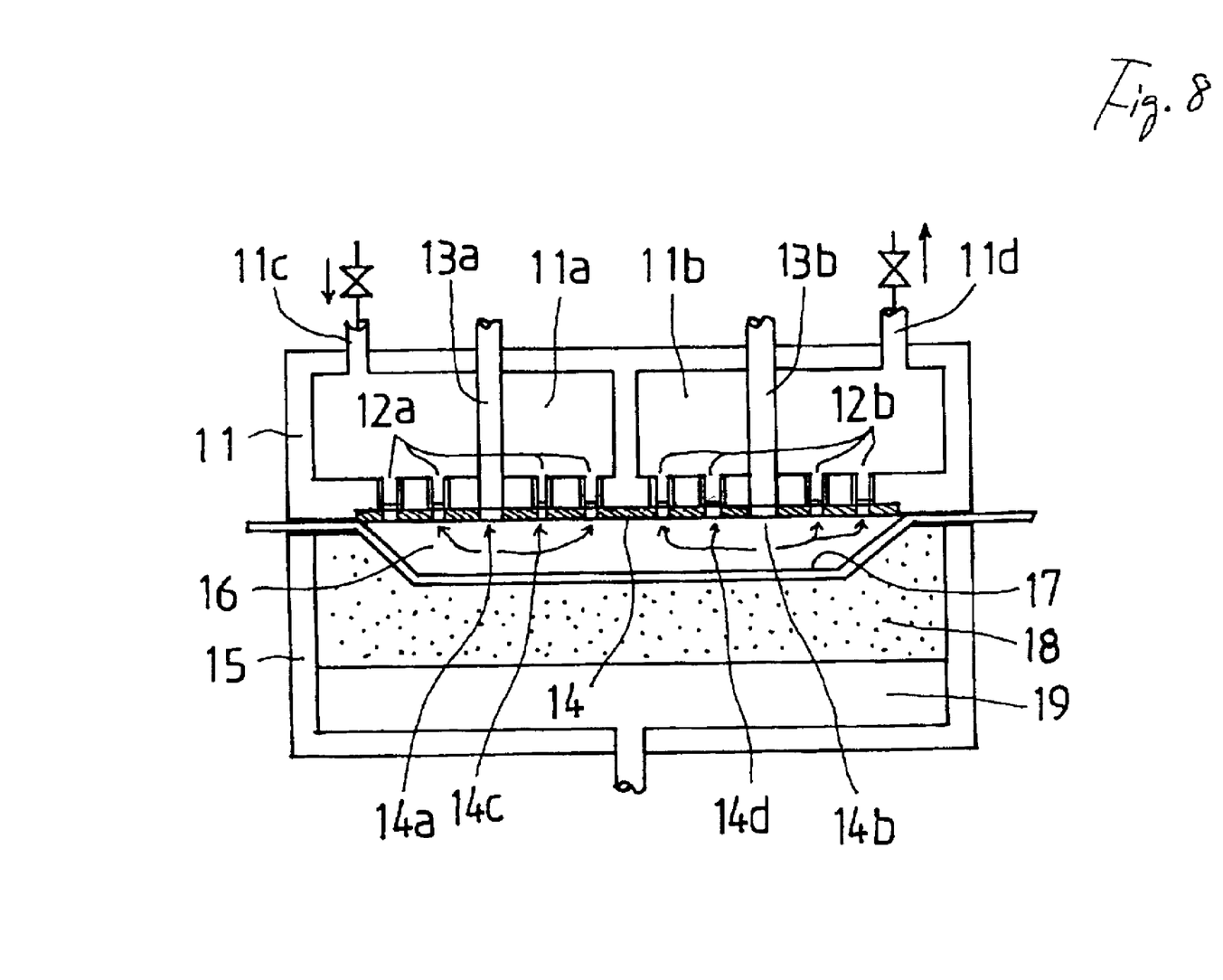
FIG. 8 is a sectional view of a molding die illustrating a conventional molding method.

A general description of a molding apparatus used by this method will be given with reference to FIG. 8. First, a space 16 for molding a foam member is formed between a bottom face of an upper die 11 and a top face of a lower die 15. Then, the top face of the lower die 15 is formed of an air ventilation porous member 18. A skin 17 attached to the surface is pressure-reduced from a lower discharge space 19, whereby the skin can be adsorbed by and fixed to the top face of the lower die 15. In addition, the inside of the upper die 11 is divided into a left steam chamber 11a comprising a left steam pipe 11c and a right steam chamber 11b comprising a right steam pipe 11d. A ventilation hole 12a and a raw material bead supply pipe 13a are disposed at the bottom face of the left steam chamber 11a. Similarly, a ventilation hole 12b and a raw material bead supply pipe 13b are disposed at the lower face of the right steam chamber 11b.

In a molding method using such apparatus, the skin 17 is disposed while the skin is adsorbed by a ventilation porous member 18. Next, base material 14 is disposed at the lower face of the upper die 11 to ensure the upper and lower dies are closed, and a space 16 for forming a foam member is provided. In this case, at the base material 14, there are provided through holes 14a 14d, 14a and 14b that correspond to the ventilation holes 12a and 12b and openings of the raw material bead supply pipe 13a and 13b, respectively. Here, raw material beads are charged in the space 16 through the raw material bead supply pipes 13a and 13b while charging air is supplied. In this case, however, the steam chambers 11a and 11b maintain pressure reduction without supplying a steam, and discharge the air in the space 16 through the ventilation holes 12a and 12b. In this way, the charging air supplied together with raw material beads is forcibly discharged, and only the raw material beads can be left and charged in the space 16.

However, in this molding apparatus, 12a and 12b are operated to pressure reduction at the same time. Thus, raw material beads are hardly charged at the periphery in the space 16. Moreover, in the case where the thickness of this space 16 is small, and an area is large, in particular, partial occlusion occurs during charging, and the raw material beads hardly reach a portion distant from the through holes 14a and 14b of the raw material bead supply pipes 13a and 13b. As a result, non-uniform charging unavoidably occurs.

In addition, as the molding method using this apparatus, there has been adopted a heating method in which heating steams are supplied sequentially from the left steam pipe 11c of the upper die 11 to the left steam chamber 11a, and then, to the steam hole 12a, and the charged raw material beads are heated, and then, is sequentially supplied from the ventilation hole 12b to the right steam chamber 11b, and then, to the right steam pipe 11d, and is discharged. However, in such heating method, there occurs a tendency that the flow of the heating steam in the space 16 short-passes between the closest ventilation holes 12a and 12b. Thus, in a case shown in FIG. 8, although fusion advances at the center portion, there occurs a deviation that fusion is delayed at a portion close to the right and left ends. As a result, there has been a serious problem that non-uniform quality in gravity, appearance, and strength of products occurs.

In addition, when a skin, base material, and a foam member are discussed from the aspect of material, for example, in a conventional combination used in a dashboard of an automobile, vinyl chloride, polypropylene, and urethane are used for the skin, back side member, and foam member, respectively, and the top and back materials are integrated in contact with each other. In recent years, there has been a growing need for causing each part of the skin, base material, and foam member to be formed of a material with the same components, making it possible to ensure recycling. From this point of view, technological development in which an olefin based elastomer (TPO) is extensively used for a skin, and an olefin based polypropylene foam (ERP) is extensively used for a foam member becomes an important task. The foregoing documents describe that a polypropylene based or polyethylene based sheet, a filler-containing solid resin, a foam resin bead or the like is used as an olefin based resin material for skin 17, base material 14, and foam member. However, with this method as well, it has been extremely difficult to uniformly manufacture a thin, composite foam molding element in different elongated shape having its comparatively small thickness, large area, and irregularities and curves, as is the case with a drain pan member of an air conditioner or a dashboard of an automobile, for example.

Further, in the conventional method, ventilation holes 12a and 12b for pressure reducing or steam supply are disposed with intervals of 25 mm to 50 mm, and correspondingly, through holes 14c and 14d are provided at the base material 14. Thus, there has been problems with higher die processing and assembling costs and lower strength of a composite foam molding element caused by the lowered strength of the base material 14.

Therefore, it is an object of the present invention to provide a molding apparatus and method for improving the uniformity of raw material beads charged in a cavity for molding a foam member in molding technique for integrating the top and back side members with each other via a foam member and molding these members, and improving the uniformity of heating and fusion of these charged raw material beads, the molding apparatus and method capable of manufacturing a thin, composite molding element in different elongated shape having its comparatively small thickness, large area, and irregularities and curves that has been hardly manufactured in the conventional techniques.

SUMMARY OF THE INVENTION

The present invention has been made in order to solve the foregoing problem. According to the present invention, there is provided an apparatus of molding a composite foam molding element for integrating a top side member and a back side member with each other via a foam member and molding these members, the apparatus comprising: providing one of a pair of dies accompanying a top side member, capable of die closing and opening to form a cavity for foam molding; providing the other die so as to accompany a back side member; arranging a charger for supplying raw material beads made of a foam resin at a die at the side of the back side member; disposing a plurality of work piece nozzles whose openings are opened at the cavity; and dividing these work piece nozzles into a plurality of groups, each of which being connected to a work piece supply device.

In addition, according to the present invention, there is provided a method of molding a composite foam molding element comprising: attaching a top side member to one die side of a cavity between a pair of dies capable of die closing and opening to form a cavity for foam molding and a back side member to the other die side; providing a charging space between these top and back side members; then supplying raw material beads made of a foam resin to this charging space; and at the same time, discharging the beads from a plurality of work piece nozzles provided at the side of the die having the back side member disposed; starting discharging from a work piece nozzle set at the most distant position from a charger for supplying raw material beads when the raw material beads are supplied; charging the raw material beads in accordance with the charging process of sequentially performing discharging up to a work piece nozzle set at the most proximal position as the raw material beads are charged; and heating these charged raw material beads to cause foaming and fusion to integrate the top side member and the back side member with each other via the foam member.

Following the above charging process, the top and back side members can be integrated with each other via the foam member using a preliminary heating step of supplying a heating steam from one of the adjacent work piece nozzles, and then, discharging the steam from the other nozzle so as to heat the charged raw material nozzles; and a heating step of causing the heating steam to be pressed from all the work piece nozzles so as to heat and fuse the charged raw material beads. Following the heating step, cooling water is supplied between the top or back side member and an interior face of a die, and the die and composite foam molding element are directly cooled, thereby making it possible to increase a cooling speed.

The composite foam molding element of the present invention is obtained by the above molding method. The composite foam molding element having the top and back side members with each other via the foam member is characterized in that the diameter of a work piece through hole provided at a position at which a nozzle opening is seen during molding, of a back side member arranged at the side of a side having work piece nozzles disposed, is equal to or smaller than 20 mm, and the pitch is set to equal to or greater than five times as long as the diameter.

According to the present invention, in integral molding of a composite foam molding element made of the top and back side members and the foam member that is a core material, the uniformity when charging or heating and fusing raw material beads is improved, and a failure such as non-uniform charging or foaming can be eliminated. In particular, a thin, composite foam molding element in different elongated shape having its comparatively small thickness, large surface area, and irregularities and curves can be manufactured without quality non-uniformity and lowered strength, making it possible to ensure equipment cost reduction.

DETAILED DESCRIPTION OF THE PREFERRED EMBODIMENTS

Hereinafter, preferred embodiments of the present invention will be described. In the present embodiment, a composite foam molding element configuring a drain pan member for air conditioner is molded. First, a top side member and a back side member each made of a polystylene based resin are provided. The top side member configures a surface layer of a finished composite foam molding element. This molding element is fabricated by publicly known means to be a sheet material of about 0.3 mm to 1.0 mm in thickness comprising a predetermined appearance, surface texture, flexibility, strength or the like. The back side member is a backup member that burdens mechanical strength of the molding element, and a plate material of about 1.5 mm to 5.0 mm in thickness is used.

Figure 1:
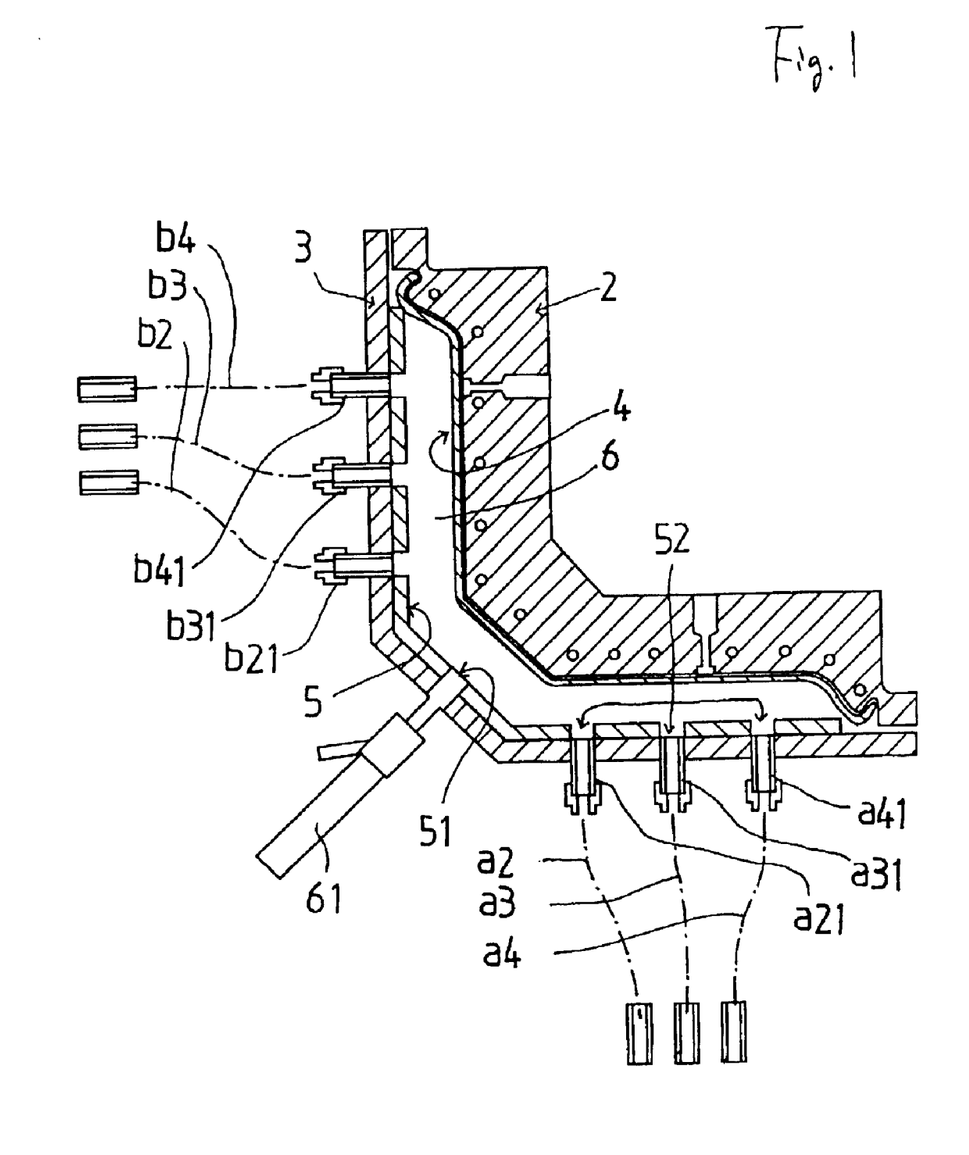
FIG. 1 is a sectional view of a molding die illustrating a molding apparatus according to the present invention.
Figure 2:
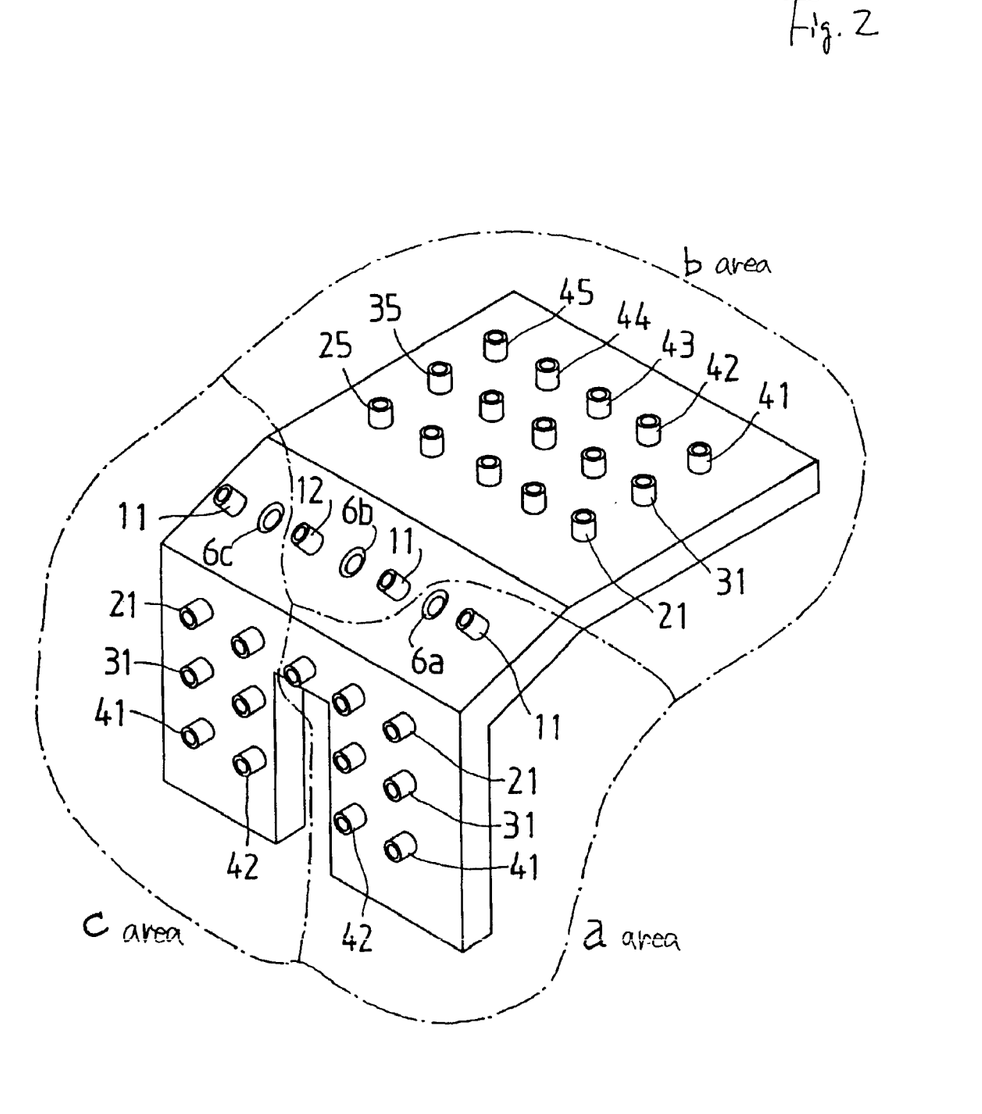
FIG. 2 is a perspective view of essential parts showing a rear face of a back die of the molding apparatus according to the present invention.

The molding apparatus of the present invention molds a composite foam molding element integrated by charging, heating, and fusing raw material beads each made of a foam resin in a space between the top and back side members disposed in a die. As shown in FIG. 1 and FIG. 2, a foam molding cavity 6 is formed of a pair of dies 2 and 3 capable of die closing and opening. One die 2 (hereinafter, referred to as a top die) accompanies a top side member, and the above mentioned top side member 4 is attached to the interior face of the die. The other die 3 (hereinafter, referred to as a back die) accompanies a back side member, and the above mentioned back side member 5 is attached to the interior face of the die.

Figure 3:
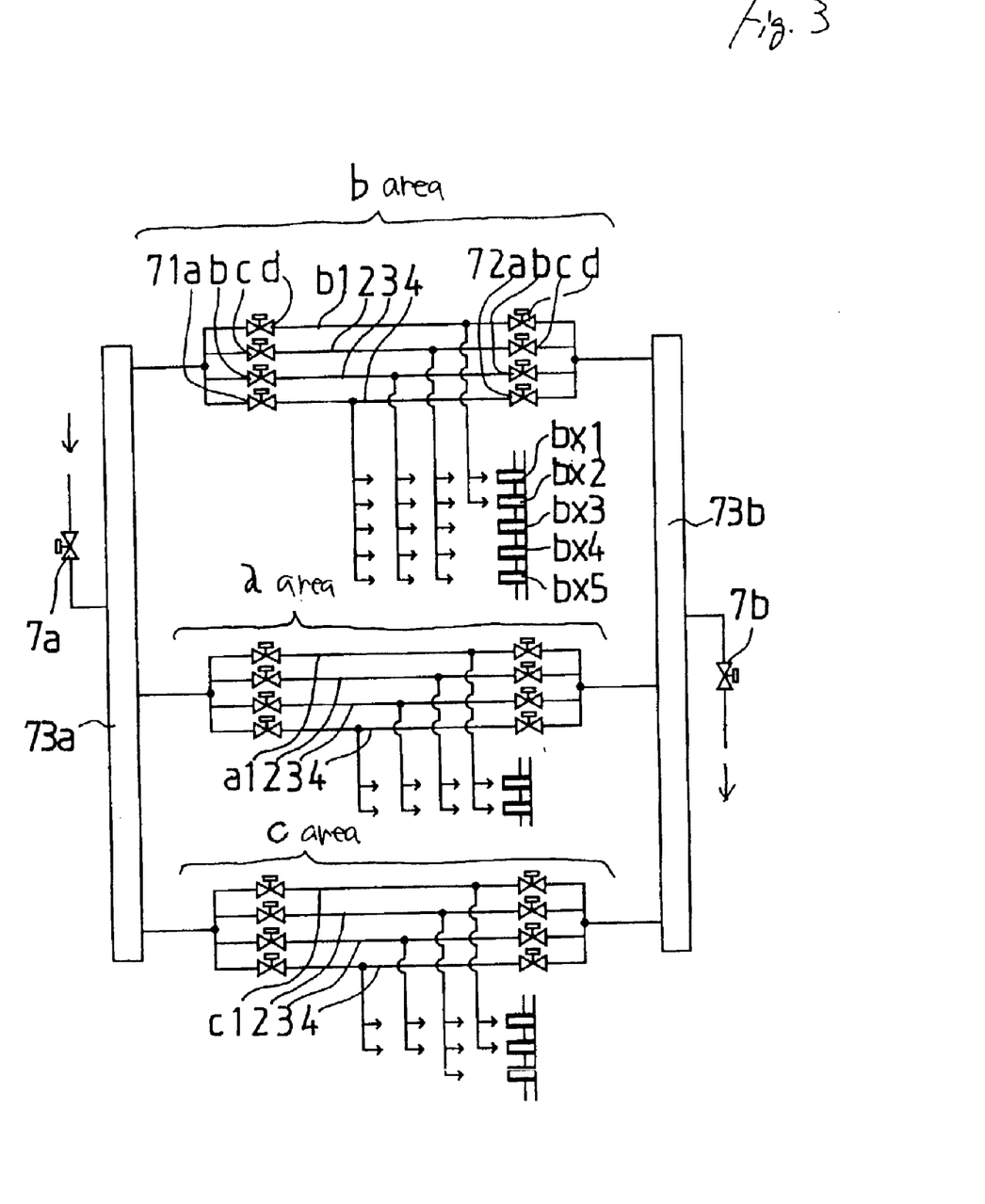
FIG. 3 is a view showing a piping system of the molding apparatus according to the present invention.

A charger 61 for supplying raw material beads each consisting of a foam resin is arranged at the rear side of this back die 3, and a plurality of work piece nozzles a21, a31, a41, b21, b31, b41, . . . are disposed so that each nozzle opening is opened at the cavity 6. In addition, these work piece nozzles a21 to b41, . . . each are divided singly or into a plurality of groups through pipe systems a2, a3, a4, b2, b3, b4 . . . , as shown in FIG. 3. Each nozzle is connected to a work piece supply device (not shown) capable of supplying one or more kinds of work piece fluids such as exhaust air, heating steam, pressurization air or fluid drain. A raw material bead through hole 51 and a work piece fluid flow through hole 52 are provided at positions that correspond to the charger 61 and the openings of a plurality of work piece nozzles a21 of the back side member 5.

As shown in FIG. 2, a rear face that corresponds to the full face of the cavity 6 of the back side 3 is segmented into three areas, "a", "b", and "c". Mount holes 6a, 6b, and 6c of the charger 61 are provided at these areas, respectively. For example, with respect to the area "b", one or more work piece nozzles of the group "b" are disposed in a plurality of columns such as work piece nozzles 11 in a first column, work piece nozzles 21 to 25 in a second column, work piece nozzles 31 to 35 in a third column, and work piece nozzles 41 to 45 in a fourth column. Such arrangement applies to the areas "a" and "b" as well. Of course, the number of areas or the number of columns for nozzles in the present embodiment is provided as a mere example.

Now, a work piece supply device in the present invention will be described by referring to a piping system of the molding apparatus shown in FIG. 3. Work piece fluids such as exhaust air, heating steam, pressurization air or fluid drain used for this molding apparatus are supplied from a piping system in order of main supply valve 7a, server tank 73a, and individual supply valves 71a, 71b, 71c, and 71d. The supplied work piece fluids are discharged from a piping system in order of individual discharge valves 72a, 72b, 72c, and 74d, server tank 73b, and main discharge valve 7b. This applies to the groups "a" and "c" as well.

Exhaust air or drain is discharged by an exhaust pump, a vacuum pump or a drain pump provided at the discharge side. Heating steam, pressurization air or the like is supplied from a steam generator or an air compressor such as boiler provided at the supply side. In addition, pressure control is performed by each of the valves on the supply and discharge sides as required. In the present invention, the main supply valve 7a and the main discharge valve 7b are connected so that these valves can be arbitrarily switched to the exhaust pump, vacuum pump or drain pump for air exhaust or drain; or the steam generator or air compressor such as boiler for pressurization air.

In this piping system, divergent pipes of the piping systems b1, b2, b3 and b4 connecting the individual supply valves 71a, 71b, 71c and 71d to the individual discharge valves 72a, 72b, 72c and 72d are connected to the work piece nozzles of each column. Therefore, in this embodiment, operations such as pressurization or pressure reducing as well as opening and closing operation for supplying work pieces can be controlled in columns relevant to each work piece nozzle.

An arrangement of the piping system is not limited thereto. Arrangements such as disposition of groups, the number of chargers or work piece nozzles belonging to each group or columns in each group may be adopted in the most efficient combination, depending on the shape, material, or molding conditions for the molding objects. For example, in FIG. 2 and FIG. 3, although work piece fluids are controlled in two stages, i.e., in units of groups and columns, the piping system is further segmented, thereby making it possible to control work piece fluids in units of a single work piece nozzle.

Figure 4:
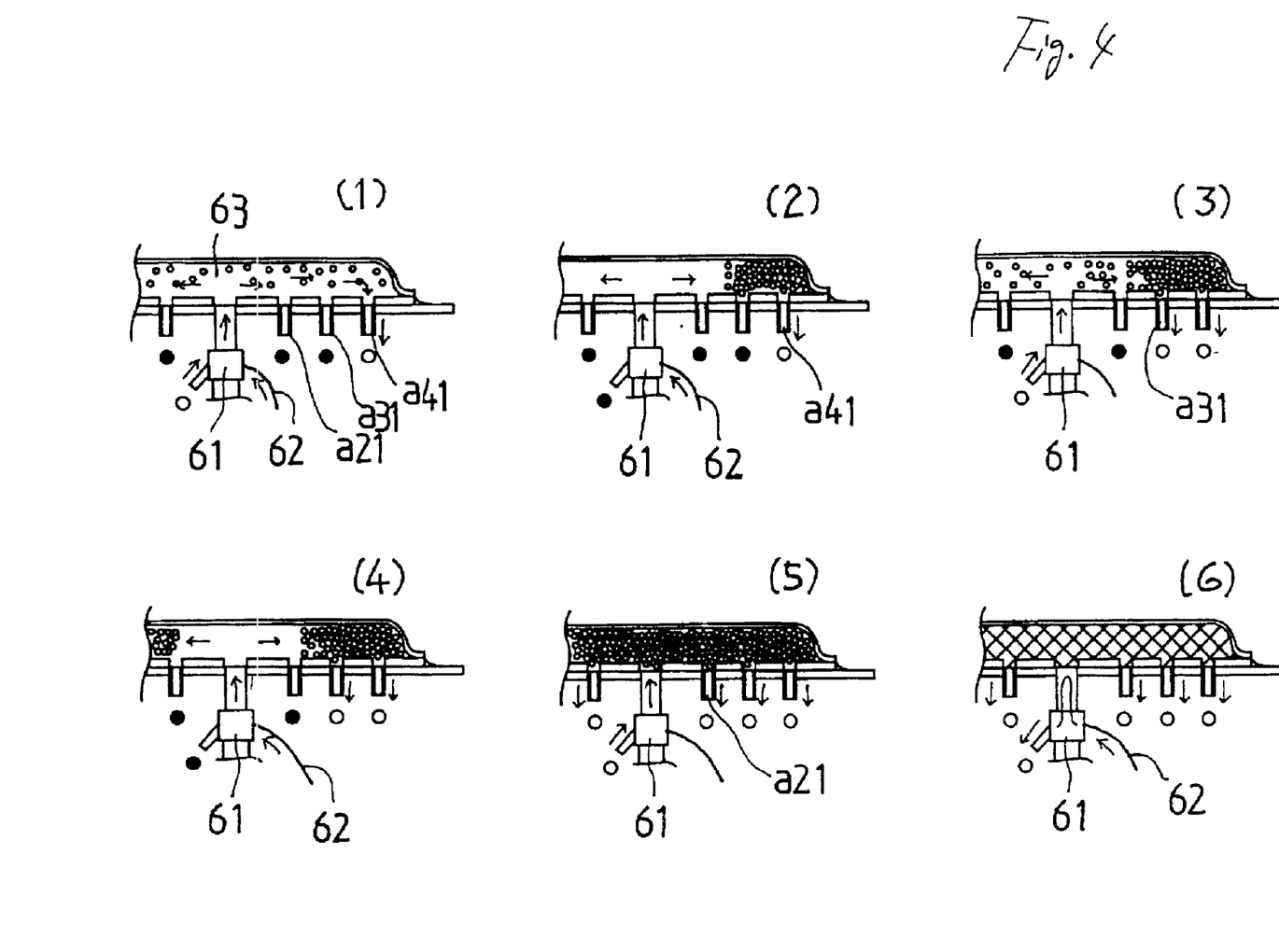
FIG. 4 is an illustrative view showing the steps of the charging process in the present invention.

Now, a method of molding a composite foam molding element using the molding apparatus of the present invention will be described in detail with reference to FIG. 1 and FIG. 4.

A first method is characterized by the charging process. A basic operation is described below. First, as shown in FIG. 1, a top side member 4 is disposed at the side of a top die 2 of a cavity 6 between a pair of dies 2 and 3, and a back side member 5 is disposed at the side of a back die 3. Next, a charge space is provided between these top and back side members 4 and 5. Then, raw material beads each made of a foam resin is supplied to this charge space together with charge air. Further, air is exhausted from a plurality of work piece nozzles a21 to a41 and b21 to b41 provided at the side of the die 3 having the back side member 5 disposed, and raw material beads are charged. One of the important features in this charging process is that, in exhausting operation of the work piece nozzles, air exhaust is started from a work piece nozzle (work pieces a41 and b41 in FIG. 1) set at the most distant position from the nozzle tip end of the charger 61, and air exhaust is performed sequentially up to a work piece nozzle (work piece nozzles a21 and b21 in FIG. 1) set at the most proximal position as raw material beads are charged. A detailed description will be given by exemplifying a combination between the charger 61 and the work piece nozzles a21, a31, and a41.

Step (1): Of the work piece nozzles a21, a31, and a41, the work piece nozzle a41 that is the most distant from the charger 61 is placed in an exhaust state, and the frontal work piece nozzles a21 and a31 are turned OFF to stop operation. Then, the raw material beads carried from a raw material tank (not shown) at a carrying pressure are supplied to a charge space 63 from the charger 61 with a charge air 62. In this case, the raw material beads are accumulated in the vicinity of an end at which the work piece nozzle a41 of the charge space 63 is positioned.

Step (2): Next, the supply of the raw material beads is temporarily stopped, a pressure is applied to the raw material beads in the vicinity in which the work piece nozzle a41 is positioned by the supply of the charge air 62, and an additional pressure for accelerating charge is applied.

Step (3): The work piece nozzle a31 is turned ON to be placed in an exhaust state, and the supply of raw material beads is restarted to continue charging, and the raw material beads are accumulated in the vicinity in which the work piece nozzle a31 is positioned.

Step (4): As in the step (2), an additional pressure is applied to the raw material beads charged in step (3).

Step (5): A work piece nozzle a21 is turned ON to be placed in an exhaust state (at this stage, all the work piece nozzles are turned ON). In addition, the supply of raw material beads is restarted to continue charging, and the raw material beads are accumulated from the work piece nozzle a21 to a position of the charger 61.

At each of these steps, with respect to the accumulated raw material beads, the exhaust of the distant work piece nozzles is continued. Thus, charging is serially advanced, and the entire charging density increases.

The step (6) is a blow back step in which the pressure of the charge air 62 and the carrying pressure of the raw material beads are reversed, and the raw material beads in the charger 61 and the carrying pipe are fed back to the raw material tank side.

The foregoing description is briefly given by exemplifying a combination of the charger 61 and the work piece nozzles a21, a31 and a41. Of course, the present invention is applicable to a variety of individual work piece nozzles in each of the groups "a", "b", and "c". That is, each of the individual supply valves 71a to 71d and discharge valves 72a to 72d is controlled, charging operation is performed in units of individual nozzles and in units of columns each consisting of a plurality of nozzles, whereby the charging process corresponding to the shape of a desired composite foam molding element can be adopted. After charging, the charged raw material beads are heated, foamed, and fused, and then, the top side member 4 and the back side member 5 are integrated with each other via the foam member, whereby a composite foam molding element can be obtained.

Now, a second method characterized by the heating and fusing process of the method of molding the composite foam molding element according to the present invention will be described here.

This method performs the above mentioned charging process, followed by the preliminary heating step and the heating step. That is, the preliminary heating step supplies heating steam from one work piece nozzle (for example, work piece nozzle a31 in FIG. 1) of the adjacent work piece nozzles, exhausts air from the other work piece nozzle (nozzles a21 and a41 in FIG. 1), distributes the heating steam, and heats the charge raw material beads. In addition, the heating step pressurizes the heating steam from all the work piece nozzles (work piece nozzles a21, a31 and a41 in FIG. 1 in the previous example), and heats and fuses the entire charge raw material beads. Hence, the uniform heating and fusing process free of temperature non-uniformity can be implemented, and the top side member and the back side member can be integrated with each other via the foam member.

This method is applicable to a piping system shown in FIG. 3. That is, a heating steam is supplied from a main supply valve 7a, a main discharge valve 7b is connected to the exhaust system to be set so as to remove the waste steam. Each of the supply valve and discharge valve is controlled for each of the work piece nozzle groups such as groups "a", "b" and "c", and the heating and fusing process including the preliminary heating step and the heating step can be applied in units of individual nozzles or in units of the foregoing columns.

With respect to the length of the path of a heating steam passing through the inside of the charge raw material beads, in the case of a conventional method, long and short paths coexist, and a significant dispersion occurs with a heat rate applied to the charge raw material beads, and the resultant temperature non-uniformity causes the fusion non-uniformity of the foam molding element. However, according to the heating and fusing process of the present invention, the distribution path of the heating steam communicates between the adjacent work piece nozzles. Therefore a distance is comparatively short and uniform, and thus, dispersion becomes small under the heating conditions and the fusion non-uniformity of the foam molding element is significantly improved.

Further, in the preliminary heating step, the distribution distance of the heating steam is reversed conveniently without being fixed to a single direction, and further, repeats reversal, thereby making it possible to further restrict heating non-uniformity. As a previous stage of the preliminary heating step, a method for adding the step of supplying a steam at a temperature equal to or smaller than the fusion temperature to exhaust the air in the charge space, and then, internally filling the steam in advance is preferable because the air that is an obstacle of foaming the raw material beads can be removed, and uniform heating at the later stage can be effectively performed. In this case, air may be supplied or exhausted between the work piece nozzles distant from each other, for example, between the work piece nozzles a21 to a41.

The apparatus and method of molding the composite foam molding element according to the present invention are characterized by the above mentioned points. The apparatus and method are used to effectively restrain charging non-uniformity, heating non-uniformity, and fusion non-uniformity. When any of the top and back side members and raw material beads used there is made of a synthetic resin made of the same components, the raw material beads form a foam molding element in the process of heating and fusing the raw material beads. At the same time, the entirety can be integrated by fusion with the top and back side members. Thus, the molding method and apparatus can be particularly preferred.

Further, in a structure comprising a conventional chamber, it has been necessary to dispose a core bent for supplying and discharging a variety of work piece fluids at a full face of a die with pitches of 25 mm to 40 mm. However, in the case of the work piece nozzles according to the present invention, the foregoing charging operation or heating and fusing operation is possible. Pitches of 100 mm to 200 mm can be set, and the number of dispositions is about $1/10$ of the conventional number of dispositions. Thus, the die assembling and processing costs can be significantly reduced, and is advantageous from the aspect of equipment coat.

Figure 6:
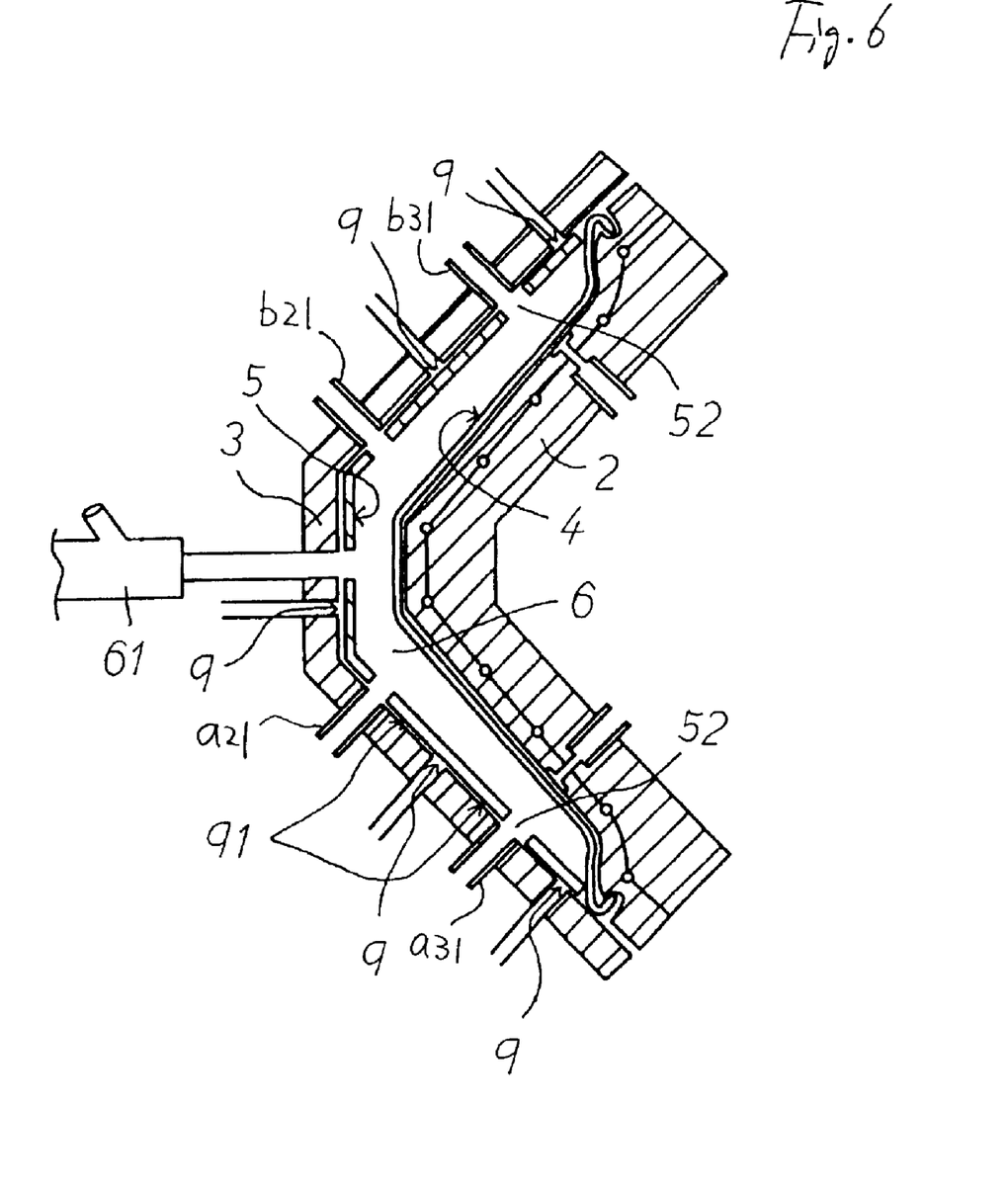
FIG. 6 is a sectional view showing a molding die for implementing a specific cooling method.
Figure 7:
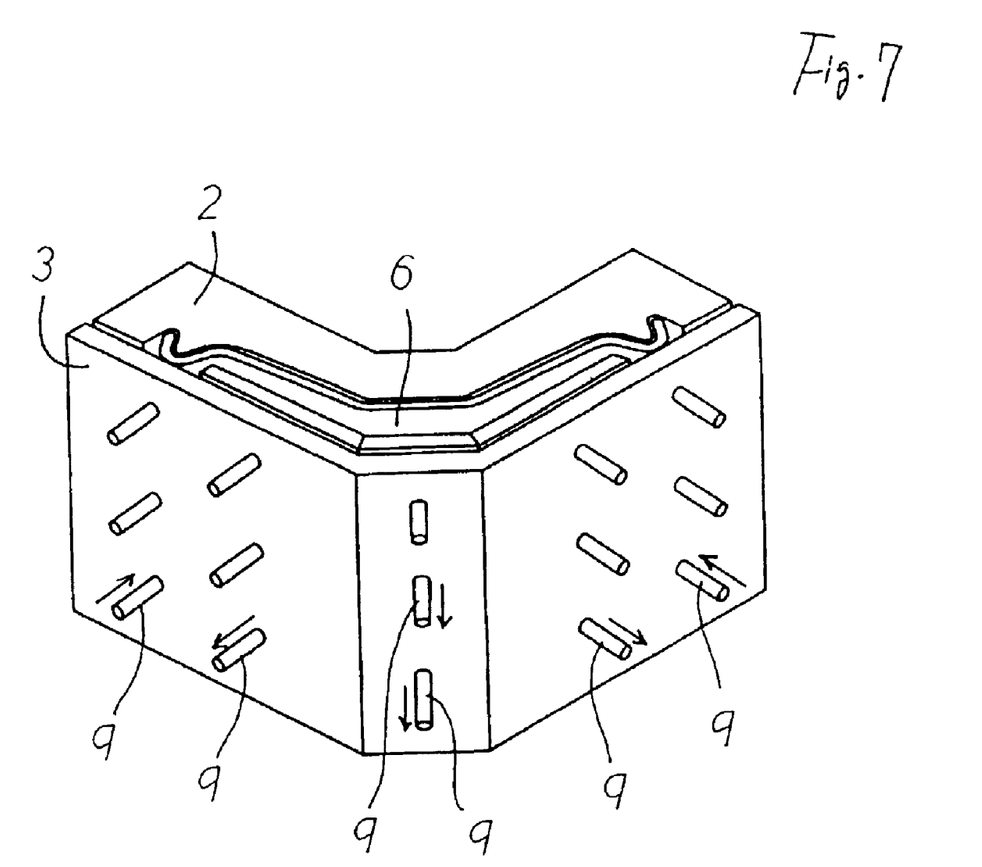
FIG. 7 is a perspective view showing the molding die shown in FIG. 6.

Following the above heating and fusing process, a die is cooled, and a composite foam molding element is removed. In a general cooling method including blowing cooling water from the rear face of a die, much time is required for cooling, and cooling non-uniformity can occur due to a difference in partial heat capacity of the die. Then, other method to conduct cooling water between the inner surface of die and the top or back side member as shown in FIG. 6, for directly cooling the die and the composiite foam molding element is also possible. Thus, as shown in FIG. 6, a number of water supply and exhaust openings 9 are provided at a back die 3, water is supplied to a gap 91 between the back side member 5 and the back die 3 opposed thereto, and the back die 3 and the composite foam molding element are directly cooled. In this manner, the cooling efficiency is remarkably improved, the cooling time can be reduced, and the cooling non-uniformity is eliminated, thus making it possible to obtain a uniform, composite foam molding element. As shown in FIG. 7, a number of supply and discharge openings 9 are divided into a water supply side and a water exhaust side. The water supply and exhaust valves connected to these openings are switched for every appropriate time interval to reverse the water supply and exhaust sides, whereby the flow direction of cooling water can be reversed. Similarly, the water supply openings 9 may be disposed at the top die 2.

Figure 5:
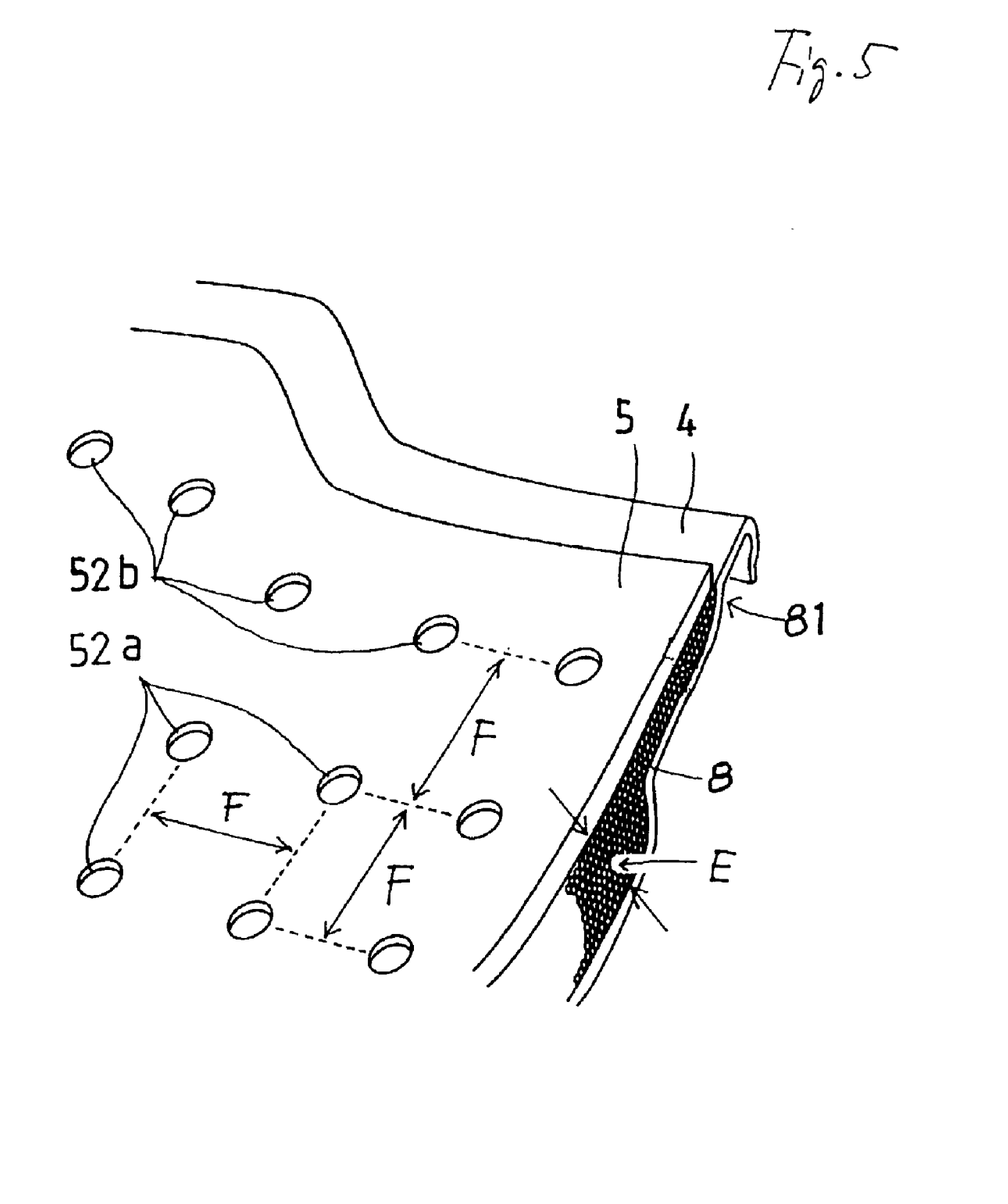
FIG. 5 is a perspective view of essential parts illustrating a composite foam molding element according to the present invention.

Now, a composite foam molding element according to the present invention will be described with reference to FIG. 5.

The features of the composite foam molding element according to the present invention are obtained by any of the foregoing methods of molding the composite foam molding elements. In the composite foam molding element having the top and back side members 4 and 5 integrated with each other via the foam material 8, the diameter of each of the work piece distribution holes 52a and 52b being present on the plate face of the back side member 5 disposed at the side of the back die 3 having work piece nozzles (refer to reference numerals a21, a31 and a41 in FIG. 1) disposed, the holes being provided at positions at which the nozzle openings are seen during molding is equal to or smaller than 20 mm in size, and the pitches F and D are set to be equal to or greater than 5 times as large as the diameter of the hole. In this manner, in the present invention, the disposition pitch can be set to be comparatively greater relevant to the diameter of the work piece distribution hole. Thus, even if the work piece distribution holes are provided, the mechanical strength of the back side member 5 is not lowered. In addition, the composite foam molding element according to the present invention is small in thickness relevant to a surface area, and can be formed in thin, different elongated shape having irregularities or curves. Thus, in particular, this molding element can be preferably used for composite members of the home electronics product described later or interior members of a vehicle such as automobile.

Further, of the work piece through holes 52a and 52b provided at the back side member 5, a mutual interval F of the work piece distribution hole 52a excluding the work piece distribution hole 52b disposed along the peripheral rim of the composite foam molding element (corresponding to a portion at which the top side member 4 and the back side member 5 are directly superimposed with each other at a terminal end portion 81 of a foam member 8), can be defined in pitches of at least 100 mm at a portion at which the thickness E of the foam member 8 is less than 10 mm, and can be defined in pitches of at least 150 mm at a portion at which the thickness E is equal to or greater than 10 mm. The diameter of the work piece distribution hole 52a is generally set to about 10 mm. In this embodiment, the mutual pitches of the work piece distribution holes 52a are 10 times or more of the diameter in size, and thus, there is no danger that the mechanical strength of the back side member 5 is lowered.

In addition, the composite foam molding element according to the present invention is preferably applied in particular to specific uses when the thickness of the internal foam member is set under the conditions described below.

(1) When the molding element is employed as a container, the thickness of the foam member at a site that is 70% or more of the surface area of the top side member is set to 30 mm or less.

(2) When the molding element is employed as an exterior heat insulating member of an air conditioner, an air cleaner, a refrigerator or the like or a composite element of a home electronic product such as drain pan member or air cooling duct thereof, the thickness of the foam member at a site that is 70% or more of the surface area of the top side member is set to 30 mm or less.

(3) When the molding element is employed as an architectural interior material such as ceiling material, wall material, partition wall face material or floor material, the thickness of the foam member at a site that is 90% or more of the surface area of the top side member is set to 100 mm or less.

(4) When the molding element is employed as an interior member used for an interior portion a vehicle such as automobile, including as door trim, glove box, trunk room, installation panel or ceiling, the thickness of the foam member at a site that is 70% or more of the surface area of the top side member is set to 30 mm or less.

(5) When the molding element is used as a floor member of a vehicle such as automobile, the thickness of the foam member at a site that is 70% or more of the surface area of the top side member is set to 150 mm or less.

(6) When the molding element is used as a shock absorbing member such as bumper of a vehicle such as automobile, the molding element is formed in thick blocks when the entire top side member is expanded in vertical direction relevant to longitudinal direction, and the thickness of the foam member at a site corresponding to its top is set to 500 mm or less.

As has been described above, the composite foam molding element obtained by the improved molding apparatus and method according to the present invention is provided at a low cost as a large sized member being excellent in design properties, elasticity touch properties, heat insulation properties, sound absorption properties, strength of board material or production cost, the member being free of dispersion in quality. In particular, this material is particularly useful as a composite element of a home electronics product, an interior member of a vehicle such as automobile or architectural interior material listed below.

(1) Composite elements of home electronics product: For example, exterior heat insulating member of air conditioner, air cleaner, refrigerator or the like or functional member of internal drain pan member, air cooling duct member or the like (2) Interior member of vehicle such as automobile: For example, interior members such as door trim, glove box, trunk trim, and instrument panel. Elongated members such as shock absorption member. In particular, this use is effective in cost reduction of large-sized parts because a large area is made available by integral molding.

(3) Architectural interior material: For example, excellent amenity can be provided in the fields of ceiling materials, wall materials, and floor materials applied in a conventional synthetic resin product.

What is claimed is:

1. A method of molding a composite foam molding element comprising:

attaching a top side member to a first die side of a cavity between a pair of dies capable of closing and opening to form a cavity for foam molding and a back side member to a second die side of said cavity; and a charging process comprising:

providing a charging space between the top and back side members;

supplying raw material beads made of a foam resin to the charging space;

discharging air from a plurality of work piece nozzles located at the side of the die wherein the back side member is located;

starting air discharging from a work piece nozzle located at a most distant position from a charger for supplying raw material beads when the raw material beads are supplied;

charging raw material beads during said starting air discharging and sequentially discharging air from work piece nozzles located successively closer to a work piece nozzle located at the most proximal position from the charger as raw material beads are charged; and heating charged raw material beads to cause foaming and fusion to integrate a top side member and a back side member with each other via a foam member.

2. A method of molding a composite foam molding element as claimed in claim 1, wherein any of said top side member, back side member, and raw material beads is made of a same resin.

3. A method of molding a composite foam molding element as claimed in claim 1, wherein said discharging air and said charging raw material beads further comprise at least once repeatedly exhausting air from a work piece nozzle while supplying raw material beads from a charger and exhausting air from a work piece nozzle while not supplying raw material beads and continuing supplying charge air.

4. A method of molding a composite foam molding element, wherein, following the charging process as claimed in claim 1, said top side member and back side member are integrated with each other via a foam member by supplying heating steam from one of said work piece nozzles, and exhausting air from the other nozzle so as to heat raw material beads; and pressurizing the heating steam from all the work piece nozzles so as to heat and fuse raw material beads.

5. A method of molding a composite foam molding element as claimed in claim 1, wherein, following the heating and fusing, supplying cooling water between a top or back side member and an interior face of a die for directly cooling the die and composite foam molding element.

* * * * *